INVENTOR
ERICH BECK
HANS BODE

United States Patent Office 2,945,634
Patented July 19, 1960

2,945,634
MACHINE FOR MIXING AND COMMINUTING MATERIALS

Erich Beck, Augsburg, and Hans Bode, Kassel, Germany, assignors, by mesne assignments, to Henschel-Werke Gesellschaft mit beschraenkter Haftung Filed May 21, 1956, Ser. No. 586,109

Claims priority, application Germany May 20, 1955

7 Claims. (Cl. 241—98)

This invention relates to the treating of powdery and granular material, and more particularly to the mixing and comminuting of powdery and granular materials.

An object of the invention is to provide means by which powdery and granular materials may be mixed with each other and/or with liquids in such a manner as could be obtained hitherto only in the treatment of liquids.

Another object of the invention is to provide means for obtaining a high grade comminution of powdery and granular materials.

A further object of the invention is to provide means for the performance of a highly effective so-called "whirl sintering," i.e. means by which metal parts are covered with a synthetic material which is applied in powdery form under the action of a whirling current of a gaseous medium to the heated metal part.

Further objects and structural details of the invention will be apparent from the following description when read in conjunction with the accompanying drawings forming part of this specification, wherein.

Figure 1:
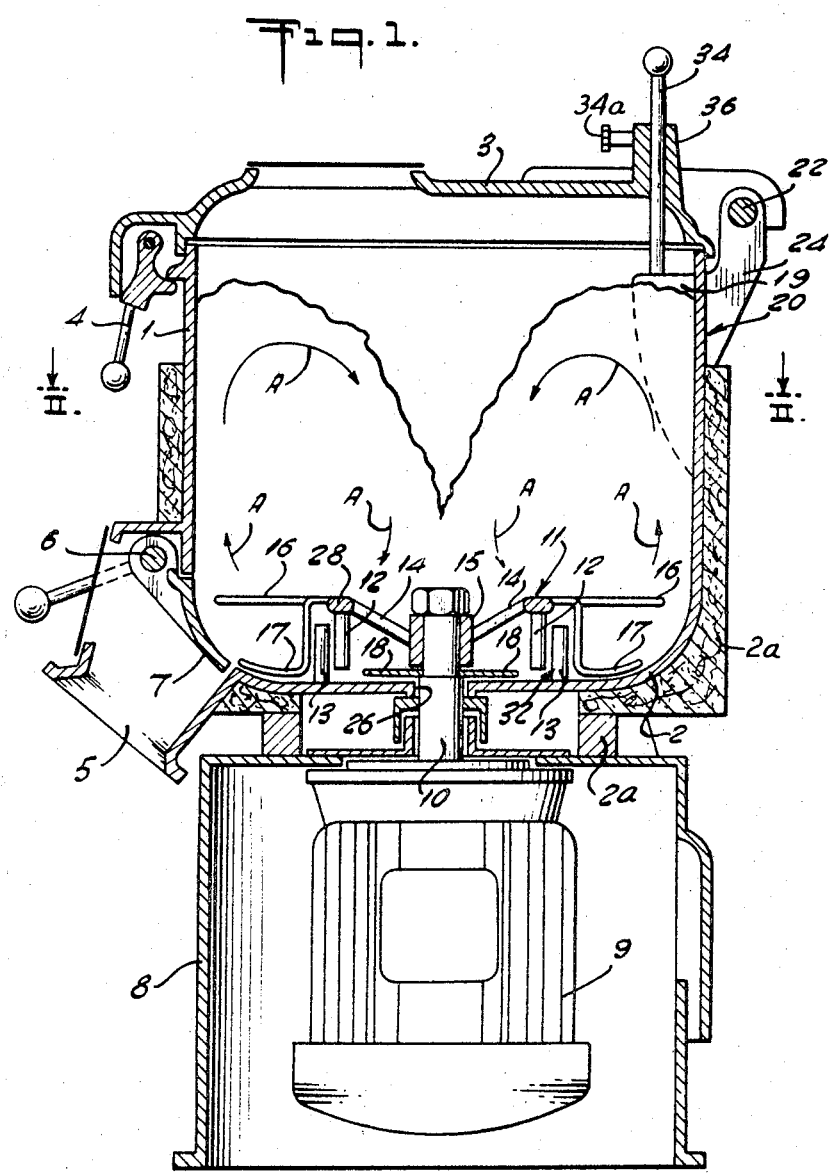
Fig. 1 is a vertical sectional view of a machine according to the invention.
Figure 2:
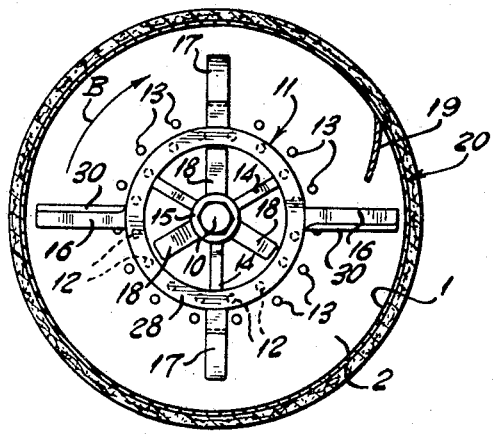
Fig. 2 is a horizontal sectional view of the machine shown in Fig. 1, taken on line II—II of Fig. 1.

Referring now to Figs. 1 and 2, 20 generally indicates a mixing container comprising a cylindrical portion 1 and a bottom portion 2 integral with each other. A cover 3 swingably mounted on the cylinder 1 on a horizontal pin 22 carried by a bracket 24 may be used for closing the mixing container 20. The cover 3 is equipped with a quick action locking device 4, by means of which its closing position may be secured in a short time. If desired, a plurality of locking devices 4 may be arranged on the cover 3 or a different type of cover, for example a cover swingably mounted on a vertical bolt for displacement in a horizontal direction may be used.

The container 20 is immovably mounted in a suitable manner on a casing 8 surrounding a driving electrical motor 9.

The shaft 10 of the electric motor 9 penetrates into the container 20 through a bore 26 in the bottom 2 of the latter.

A rotating tool generally indicated by 11 is rigidly connected with said shaft 10 so as to participate in a rotation of the latter. The longitudinal axis of said rotating tool 11 coincides with the longitudinal axis of the cylinder 1 of the container 20. According to the embodiment shown in the drawings, the rotating tool 11 comprises a hub 15 keyed to the motor shaft 10 and connected with a plurality of spokes 14 carrying a ring 28.

A plurality of downwardly extending pins 12 is mounted on the rotatable ring 28. Furthermore, two radially extending aerating rods 16 are secured to said ring 28 at diametrically opposite points. As best shown in Fig. 2, the leading edge of each of said rods 16 is provided with a blade 30 so as to reduce the resistance to a minimum during a rotation in the aerated dry material whereby the output of the motor 9 may be reduced to a minimum. The rods 16 extend from the ring 28 almost to the inner surface of the cylinder 1. Moreover, two downwardly extending discharging elements 17, a portion of which extends parallel to the bottom 2, are mounted on said ring 28 at diametrically opposite points between said aerating rods 16. Said discharging elements 17 assist in the discharge of the mixed material through an outlet 5, when the flap 7 swingably mounted on the container 20 at 6 is opened.

The rotary mixing tool 11 cooperates with a concentric stationary mixing tool 32 comprising a plurality of pins 13 secured to the bottom 2 of the container 20 along a circle having a diameter larger than the diameter of the ring 28.

In accordance with the invention the rotary tool 11 is rotated at a high speed so as to obtain a circumferential speed of approximately 60 meters per second. Thus, air or another gaseous medium present in the container 20 or introduced into the container 20 is very finely distributed in the materials to be mixed by means of the rotary tool 11 running at a high speed whereby the materials to be mixed are brought into a fluid state and the mixing tools 11 and 32 effect in addition thereto the necessary circulation of the materials in the container 20.

The air required for bringing the materials into a fluid state is sucked in by means of the high speed rotary tool 11 from the air cushion being above the materials to be mixed.

Preferably, in addition to above mentioned outer discharging elements 17 rotating with the rotary tool 11, there are inner dischargers 18 in the shape of rods arranged below the hub 15 of the rotary tool 11 and operatively connected with the motor shaft 10.

As best shown in Fig. 1 a rod 34 carrying a guiding or turning-over plate 19 of sheet metal is adjustably mounted in a vertical bore of a lug 36 of the cover 3 of the container 20. A set screw 34a is provided to permit vertical adjustment of the rod 34 with the plate 19. As may be gathered from Fig. 2, one edge of said guide 19 is in contact with the inner surface of the cylinder 1.

When the machine is in operation, the materials to be mixed and the gaseous medium required for the aerating are sucked in by the rotating tool 11 like a fluid in the shape of a water spout. In Fig. 1, the circulating movement of the materials to be mixed is indicated by the arrows A. A gyroscopic movement in the direction of rotation of the rotary tool and indicated by the arrow B in Fig. 2 is superimposed to said circulating movement. Said gyroscopic movement of the materials to be mixed may be controlled and braked by above mentioned adjustable guide 19 whereby an optimum of turning over of the materials to be mixed at the highest point in the mixing container 20 may be obtained.

If desired a liquid or liquids may be added to the solid powdery or granular material or materials in the machine for mixing same together, provided only that the addition of the liquid or liquids does not transform the mixture of solid materials and liquid into a dough or paste, that however said mixture of solid materials and liquid remains in a condition wherein it could be shovelled.

As will be readily understood from above, the machine according to the invention permits the mixing and comminuting of powdery and granular substances with each other, with or without addition of liquids, in a manner as hitherto possible only in the treatment of liquids. For this purpose, as described above, the described substances are brought into a state similar to that of liquids. The substances or materials are uniformly mixed with air or another gaseous medium by aerating. In such an aerated condition the powdery materials have a willingness to flow similar to that of liquids, so that they may be forced to circulate within the mixing container 20 by means of the rotary tool 11 having a high circumferential speed and may be intensively mixed with each other in a very short time of approximately 10–60 seconds. Furthermore, the materials may be comminuted by the use of the stationary tool 32 surrounding the rotary tool 11 and cooperating with the latter. Moreover, the stationary tool 32 has the additional effect of increasing the degree of aeration and accelerating the mixing.

The aerating rods 16 mounted on the rotating tool 11 and extending almost to the inner surface of the cylindrical container 20 increase to a great extent the capability of the rotating tool 11 to suck in air from above, to distribute same in a very fine manner within the mixture and to subject the mixture to a forced circulation within the container.

The rotating discharging means 17 and 18 in the shape of rods or bands or the like extending for a predetermined distance along a flat or curved portion of the bottom 2 of the container 20 contribute to a fast discharge of the mixed material in a short time, for example 5–15 seconds, through the outlet 7 when the latter is open.

If it is desired to heat the mixture during the mixing and comminuting operation in the machine, the heat caused by friction by the rotating tool 11 may be utilized or heat may be supplied to the mixing container 20 from any suitable source. Any customary heating method may be used for heating the mixture. If, as mentioned above, air or a gaseous medium is introduced into the mixing container for improving the aerating effect, hot air or a hot gaseous medium may be blown into the container whereby, at the same time, a heating of the materials in the container is obtained. If only the heat caused by friction resulting from the rotation of the rotating tool 11 in the materials is utilized, it is sufficient to provide the container with a jacket of heat insulation material, as indicated at 2a in Fig. 1.

If one or a plurality of machines are supplied with the materials to be mixed from supply tanks or containers and the mixture is to be discharged into a receiving container, the driving motor 9 and the discharge flap 7 may be automatically and periodically actuated. For this purpose, for example, time switches, magnet valves with pneumatic or hydraulic connections or servo-motors may be used.

Owing to the aerating of the material in a machine according to the invention, such a machine may be used for a so-called "whirl sintering" process by means of which a synthetic powder is applied to the surface of metal parts. One and the same machine may be used in successive steps for carrying out a mixing of the materials as a preliminary operation and, thereafter, for performing the "whirl sintering." As during the "whirl sintering" the rotary tool 11 is rotated, a de-mixing effect, i.e. a blowing of very fine particles of the material out of the whirly layer, cannot occur; thus, a machine according to the invention can be very effectively used for so-called "whirl-sintering."

Figure 3:
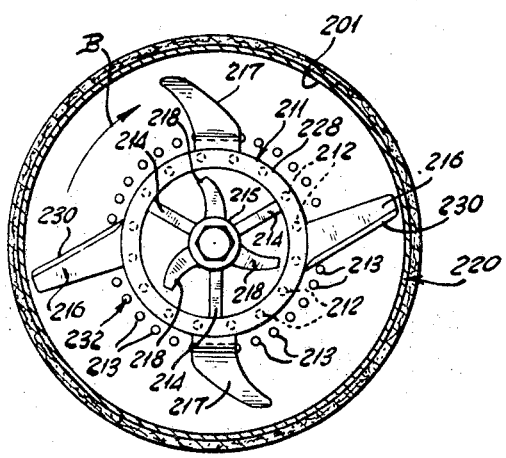
Fig. 3 is a horizontal sectional view of a machine according to the invention illustrating a different embodiment of the aerating means and discharging means.

According to the embodiment shown in Fig. 3, a mixing tool 211 is rotatably arranged in the container 220 of a machine according to the invention. The mixing tool 211 comprises a hub 215, a plurality of spokes 214 and a ring 228 equipped with a plurality of downwardly extending pins 212. In contrast to the embodiment shown in Figs. 1 and 2, the aerating rods 216 carried by the ring 228 are arranged at an angle to the radius. Such an angle relative to the radius may be in the horizontal plane, as may be gathered from Fig. 3, and/or in the verical plane for deflecting the aerating rods in upward or downward direction. Again the leading edges of the aerating rods 216 are provided with blades 230. Said blades may extend along a straight line, as shown, or may extend along a curved line.

The outer and inner dischargers 217 and 218 respectively are also at an angle relative to the radius. The leading edges of said dischargers 217, 218 are bent rearwardly in relation to the direction B of rotation. This shaping of the inner discharger 218 enables same to prevent the powdery mixed material from passage through the space 26 (see Fig. 1) between the shaft 10 and the bottom 2 of the container 20.

Figure 4:
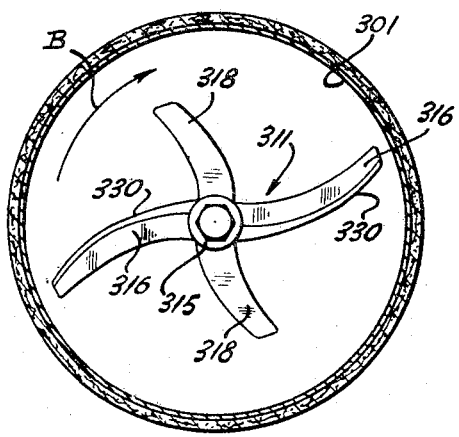
Fig. 4 is a horizontal sectional view of a machine according to the invention illustrating a further embodiment of the mixing tools.

Fig. 4 illustrates a simplified form of the mixing tools generally indicated by 311. The star-shaped mixing tool 311 rotatable in the container 320 in the direction of the arrow B comprises merely the hub 315, a pair of diametrically opposite aerating and comminuting rods 316 having curved blades 330, and a pair of diametrically opposite dischargers 318, said rods 316 and said dischargers 318 being rigid with said hub 315.

We have described preferred embodiments of our invention, but it is understood that this disclosure is for the purpose of illustration, and that various omissions and changes in shape, proportion and arrangement of parts, as well as the substitution of equivalent elements for the arrangements shown and described may be made without the departing from the spirit and scope of the invention as set forth in the appended claims.

For example, rods or plates or the like of any other suitable shape mounted on the circumference of the rotating tool 11, 211 may be used instead of the elements 16, 216 shown in the drawings for the aeration and circulation of the material.

Furthermore, the pin ring of the rotary tool 11 may be replaced by a rotatable element in the shape of a milling cutter or a blade wheel having a hub and a plurality of radially or in other direction extending blades mounted thereon.

Moreover, the cylindrical pins 13 of the stationary tool 32 may be replaced by a plurality of radially or in other direction extending vertical blades mounted on the bottom of the container in the shape of a so-called stator ring.

Preferably, those embodiments of the many feasible forms of rotary and/or stationary tools will be selected for a machine according to the invention which may be manufactured in the easiest manner.

Furthermore, the guide 19 (Figs. 1, 2) may be replaced by a guide of different shape or by a guide which is mounetd on the mixing container 20 proper instead of on its cover.

Moreover, a transmission comprising a train of gears, a belt or chain drive, may be interposed between the motor 9 and the rotary tool 11.

Instead of the rotary and stationary tools, aerating rods and discharging elements described above in connection with the drawings, tools of different shapes may be used for the mixing, comminuting, aerating and discharging of the materials; for example, radially extending, inclined or curved rods of any desired cross-section directly mounted on the hub 15 and provided with additional projections, grooves, knives or the like for improving the comminuting of the materials may be used.

What we claim is:

1. In apparatus for dry mixing and comminuting granular materials, the combination comprising, a cylindrical mixing chamber having a bottom wall, a rotor member arranged for coaxial rotation within said chamber, means extending through said bottom wall for rotating said rotor member at a high rate of speed, said rotor having a central hub and an annular member fixed in coaxial spaced relation with respect to said hub, a plurality of flat blades extending outwardly of said annular member and extending substantially to the inner surface of said mixing chamber near the lower end thereof, and guiding means within said chamber near the top thereof for inward turning over of the air-granular material mixture swirling and rotating within said chamber due to action of said rotor member.

2. Apparatus according to claim 1 wherein said guiding means comprises a curved metal plate.

3. An apparatus for dry mixing and comminuting granular materials comprising a substantially cylindrical mixing chamber having a substantially flat normally closed bottom wall and substantially cylindrical side walls, a rotor shaft extending through said bottom wall, a rotor mixing tool mounted on said shaft for rotation therewith, said mixing tool including an annular ring portion spaced outwardly from said shaft, and a plurality of outwardly extending thin flat blades each being uniformly and closely spaced from said side walls of said chamber and being spaced from and substantially parallel to said bottom wall, said rotor blades being located and arranged to rotate in a plane spaced from said bottom wall to describe a diameter of rotation at least equal to the effective height of said chamber, and means to rotate said rotor shaft and said rotor at high peripheral blade velocity whereby a charge of granular material within said chamber will be moved outwardly and at the same time air within said chamber above said granular material will be propelled downwardly along the axis of said chamber and then upwardly to mix with said granular material and effect a swirling substantially homogeneous mixture of the air with said granular material within said chamber.

4. An apparatus for dry mixing and comminuting granular materials according to claim 3, wherein said rotor mixing tool includes a hub portion and upwardly diverging spokes extending between said hub portion and said annular ring.

5. An apparatus for dry mixing and comminuting granular materials according to claim 3, including a plurality of first rod members extending downwardly from said annular ring member, and a plurality of second rod members extending upwardly from said bottom wall and being closely spaced from and substantially parallel to said first rod members.

6. In an apparatus for dry mixing and comminuting granular materials according to claim 2, wherein said curved metal plate is connected to a rod member which is vertically reciprocally mounted on said cylindrical mixing chamber.

7. An apparatus for dry mixing and comminuting granular materials comprising a substantially cylindrical mixing chamber having a substantially flat normally closed bottom wall and substantially cylindrical side walls, rotor shaft means extending through said bottom wall, a rotor member connected to said rotor shaft means for rotation thereby, said rotor member including a plurality of outwardly extending thin flat blades, each being uniformly and closely spaced from said side walls of said chamber and being spaced from and substantially parallel to said bottom wall, said rotor blades being arranged in a plane describing a diameter of rotation at least equal to the effective height of a load of material which will be mixed in said chamber, and means to rotate said rotor shaft means and said rotor at high peripheral blade velocities whereby a charge of granular material within said chamber will be moved outwardly at the same time air within said chamber above said granular material will be propelled downwardly along the axis of said chamber and then upwardly to mix with said granular material and effect a swirling substantially homogeneous mixture of air with said granular material within said chamber, and auxiliary means for mixing granular material in said chamber, said auxiliary mixing means comprising a plurality of pins circularly arranged on and extending downwardly from said annular member, and a plurality of pins circularly arranged on and extending upwardly from said bottom wall in surrounding relation to said first-mentioned plurality of pins.

References Cited in the file of this patent

UNITED STATES PATENTS

| 1,242,445 | Ittner | Oct. 9, 1917 |
| 1,866,535 | Johnson | July 12, 1932 |
| 2,075,518 | Gettelman | Mar. 30, 1937 |
| 2,149,018 | Gordon | Feb. 28, 1939 |
| 2,217,118 | Jesson et al. | Oct. 8, 1940 |
| 2,297,009 | Meade et al. | Sept. 29, 1942 |
| 2,335,002 | Eppenback et al. | Nov. 23, 1943 |
| 2,390,898 | Rechtin | Dec. 11, 1945 |
| 2,474,314 | Koehne | June 28, 1949 |
| 2,577,353 | Naidu et al. | Dec. 4, 1951 |
| 2,592,215 | Wandel | Apr. 8, 1952 |
| 2,641,453 | Teale | June 9, 1953 |
| 2,769,623 | Cawood | Nov. 6, 1956 |

FOREIGN PATENTS

| 518,318 | Belgium | Mar. 31, 1953 |